H. R. DECKER.
TIRE PROTECTOR.
APPLICATION FILED JUNE 10, 1912.

1,221,978.

Patented Apr. 10, 1917.

WITNESSES:
May Montgomery
E Fruchtsek

INVENTOR
Harry R. Decker
BY
Hardway & Cathy
ATTORNEYS.

UNITED STATES PATENT OFFICE.

HARRY R. DECKER, OF HOUSTON, TEXAS.

TIRE-PROTECTOR.

1,221,978.
Specification of Letters Patent.
Patented Apr. 10, 1917.

Application filed June 10, 1912. Serial No. 702,687.

*To all whom it may concern:*

Be it known that I, HARRY R. DECKER, a citizen of the United States, residing at Houston, in the county of Harris and State of Texas, have invented certain new and useful Improvements in Tire-Protectors, of which the following is a specification.

My invention relates to new and useful improvements in tire protectors, and has particular relation to such devices as are designed to be used on automobile and similar tires for protecting the same against wear and puncture.

The object of the invention is to provide a device of the character described composed of a suitable fabric covering designed to be secured over the tread of the tire and a plurality of detachable plugs composed of wood or any other suitable material which project through said covering and whose inner ends rest against the tire casing and whose outer ends project beyond said covering and receive the wear of the tread.

With the above and other objects in view, the invention has particular relation to certain novel features of construction and use, an example of which is given in this specification and illustrated in the accompanying drawings, wherein—

Figure 1:
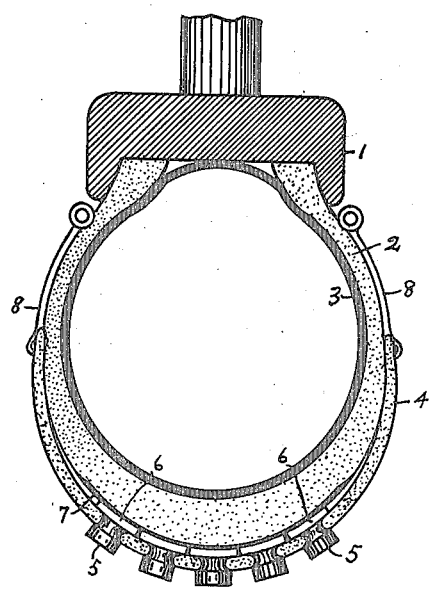
Figure 1 is a sectional view of a wheel rim and a tire secured thereto provided with my improved protector.
Figure 2:
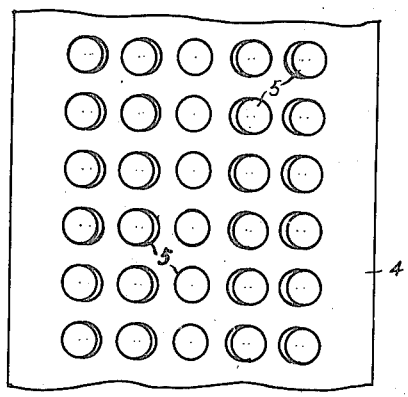
Fig. 2 is a plan view of a section of the protector looking toward the tread.

Referring now more particularly to the drawings wherein like numerals of reference designate similar parts in each of the figures, the numeral 1 refers to the wheel rim and 2 to the casing of the tire secured thereon.

The numeral 3 refers to the inner tube of the tire. The numeral 4 refers to the fabric of the tire protector. This fabric may be composed of rubberized fiber or of wire mesh fabric and in the latter case, the wire should be of copper or of some material which will not readily rust. This fabric should be of sufficient width to completely surround the tread of the tire which is likely to contact with the surface of the ground and is so woven as to have orifices therethrough to receive the detachable plugs 5.

These orifices should be preferably arranged in rows and close enough together to receive sufficient plugs to entirely protect the fabric 4 from contacting against the surface over which the machine is driven.

Figure 3:
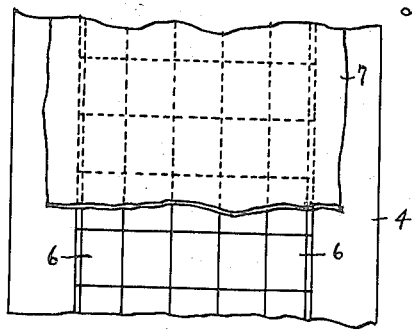
Fig. 3 shows an inside view of a section of the protector.

The body of each plug is cylindrical in shape and the base 6 of the plugs are preferably square so that said bases will fit closely together, as shown in Fig. 3 and form substantially a continuous layer which will serve to protect the tire from puncture and the outer ends of the plugs project a considerable distance beyond the fabric 4 and protect said fabric against wear and also prevent the machine from skidding when passing over a wet or slick surface.

In the construction of this protector, it is preferable to glue a number of plugs upon a section of thin fabric 7 of any convenient size and arrange the plugs thereon so that they will correspond in position to the openings through the fabric 4 and a number of said plugs may thus be inserted at the same time and this method continued until the fabric 4 is completely supplied with plugs. The protector may then be placed upon the deflated tire and secured thereon by means of stays 8 in the well known manner and the tire then pumped up. The casing 2 will thus be forced firmly against the base 6 of the plugs and will force said plugs to project entirely through the fabric 4 and will also serve as a resilient base for the plugs. The plugs will thus yield slightly to any object with which they may come in contact and the wear upon them will be reduced to a minimum.

Each plug is reduced in diameter near its base, as shown in Fig. 1 and the outer end thereof is consequently enlarged relative to this reduced neck and as the plugs are forced inwardly, the enlarged outer ends rest against the fabric 4 and the pressure will be distributed between said fabric and the casing 2.

In case a section of the plugs is destroyed by accident, or some of the plugs become worn more than others, the destroyed or worn section may be removed and a section of new plugs substituted therefor without removing all of the plugs from the protector and without discarding entirely the protector itself.

It is obvious that practically all of the wear will be upon the exposed ends of the plugs 5 and that the protector may be renewed from time to time by merely replacing said plugs and thus a very cheap tire protector is provided which may be practically renewed from time to time at a very small expense.

The plugs should preferably be made of some tough fibrous wood, but may be of rubber or any other desirable material which may be found practical.

What I claim is:—

A tire protector composed of a thin, flexible covering secured over the tread of a tire casing and having a plurality of orifices therethrough arranged in circumferential and transverse rows, a plurality of plugs, each having a cylindrical body and a thin, flat base, polygonal in shape, said bases contacting with one another and forming a continuous layer around the tread of the casing, a thin fabric interposed between said bases and the tread of the casing to which said bases are secured, the bodies of said plugs extending through said orifices and beyond the covering, the projecting end of each plug being enlarged and formed into a head.

In testimony whereof I have signed my name to this specification in the presence of two subscribing witnesses.

HARRY R. DECKER.

Witnesses:
MAY MONTGOMERY,
E. FRUEHBECK.